United States Patent
Yang et al.

(10) Patent No.: US 8,734,675 B2
(45) Date of Patent: May 27, 2014

(54) METHOD FOR PREPARING $Li_4Nb_xTi_{5-x}O_{12}/C$ NANOCOMPOSITE AS AN ANODE MATERIAL FOR LI-ION BATTERIES

(75) Inventors: Maoping Yang, Anhui (CN); Xulai Yang, Anhui (CN); Dajun Liu, Anhui (CN); Xiaoming Xu, Anhui (CN)

(73) Assignee: Hefei Guoxuan High-Tech Power Energy Co., Ltd., Hefei, Anhui (CN)

( * ) Notice: Subject to any disclaimer, the term of this patent is extended or adjusted under 35 U.S.C. 154(b) by 96 days.

(21) Appl. No.: 13/485,523

(22) Filed: May 31, 2012

(65) Prior Publication Data

US 2012/0305856 A1  Dec. 6, 2012

(30) Foreign Application Priority Data

May 31, 2011  (CN) .......................... 2011 1 0143203

(51) Int. Cl.
 *H01M 4/88* (2006.01)
(52) U.S. Cl.
 USPC ....................................... 252/182.1; 252/502
(58) Field of Classification Search
 USPC .................................. 252/182.1, 519.1, 502
 See application file for complete search history.

(56) References Cited

U.S. PATENT DOCUMENTS

| 6,221,531 | B1 | 4/2001 | Vaughey et al. |
| 6,827,921 | B1 | 12/2004 | Singhal et al. |
| 2008/0078594 | A1* | 4/2008 | Harada et al. ................. 180/65.2 |

OTHER PUBLICATIONS

Yi, Ting-Feng, et al., "High-performance Li4Ti5-xVxO12 (0≤x≤0.3) as an anode material for secondary lithium-ion battery"; Electrochimica Acta 54 (2009); pp. 7464-7470.

Zhu, Nan, et al., "Graphene as a conductive additive to enhance the high-rate capabilities of electrospun Li4Ti5O12 for lithium-ion batteries"; Electrochimica Acta 55 (2010); pp. 5813-5818.

* cited by examiner

*Primary Examiner* — Mark Kopec
*Assistant Examiner* — William Young
(74) *Attorney, Agent, or Firm* — Osha Liang LLP

(57) ABSTRACT

A method for preparing a $Li_4Nb_xTi_{5-x}O_{12}/C$ nanocomposite as anode material for lithium-ion batteries is disclosed, which includes the following steps: (a) obtaining a mixture of a lithium salt, niobium pentaoxide, titanium dioxide ($TiO_2$), and a carbon source in a selected stoichiometric ratio; (b) mixing the mixture in a dispersant to produce a slurry; (c) drying the slurry to produce a dried mixture; (d) treating the dried mixture under a protective atmosphere, according to a heating program to produce the $Li_4Nb_xTi_{5-x}O_{12}/C$ nanocomposite, wherein the heating program comprises: calcining the dried mixture at 600° C. for 2-6 hours, heating it at a rate of 2-20° C. per minute to 950-980° C., cooling it by natural cooling to 800-850° C., maintaining the temperature at 800-850° C. for 16 hours, and cooling it by natural cooling to room temperature.

11 Claims, 6 Drawing Sheets

METHOD FOR PREPARING $Li_4Nb_xTi_{5-x}O_{12}/C$ NANOCOMPOSITE AS AN ANODE MATERIAL FOR LI-ION BATTERIES

CROSS REFERENCE TO RELATED APPLICATIONS

The present invention claims the priority of Chinese Application No. 201110143203.2, filed on May 31, 2011. The disclosure of this prior application is incorporated by reference in its entirety.

BACKGROUND OF INVENTION

1. Field of the Invention

The present invention relates to the field of lithium batteries, particularly to materials for anodes of lithium ion batteries.

2. Background Art

Lithium ion batteries have been the focal point of much research due to their higher energy density. Lithium ion batteries have been successfully used in various applications, such as hybrid electric vehicles, mobile electric applications, and renewable energy storage devices. One of the key safety issues in lithium ion batteries would be the dendritic lithium growth on the anode surface at high charging currents because the conventional carbonous materials approach almost 0 V vs. $Li^+/Li$ at the end of Li ion insertion.

$Li_4Ti_5O_{12}$ has received considerable interest as an anode material for secondary rechargeable lithium-ion batteries. Spinel structure $Li_4Ti_5O_{12}$ consists of eight subcells and each subcell has full oxygen atoms, four octahedral interstices and eight tetrahedral interstices. In each elementary cell, two octahedral sites are filled with Li and Ti atoms in a ratio of 0.33:1.66 and one tetrahedral site is filled with one Li atom. Three Li ions can be inserted into the structure at approximately 1.5V vs. $Li^+/Li$. The insertion and extraction of lithium ions is thus a two-phase reaction:

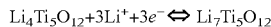
$Li_4Ti_5O_{12}+3Li^++3e^- \Leftrightarrow Li_7Ti_5O_{12}$

Compared to the conventional carbonous materials, $Li_4Ti_5O_{12}$ has been viewed as a promising alternative material for negative electrodes of lithium-ion batteries, because it has several outstanding advantages. These advantages, for example, include: (i) The Li ion insertion into the cubic $Li_4Ti_5O_{12}$ spinel structure occurs with little change in the lattice parameter. Consequently, it has near zero volume change (i.e., a zero-strain insertion material) during the charge/discharge processes, which enables an outstanding cycling stability; (ii) High insertion potential of 1.55V (versus $Li^+/Li$), which ensures high safety with electrolyte solution and also non-lithium plating; (iii) Three-dimensional lithium ion diffusion channels producing excellent lithium-ion mobility, which favors lithium-ion batteries charging/discharging fleetly; and (iv) Sharp end-of-charge and end-of-discharge indicators, which are useful for controlling cell operation and preventing overcharge and overdischarge.

Despite the advantages mentioned above, however, pristine $Li_4Ti_5O_{12}$ cannot meet the need of practical applications under high current conditions due to its poor electric conductivity, which leads to its low rate capacity. Many efforts have been devoted to improving and optimizing the conductivities of $Li_4Ti_5O_{12}$. These efforts include: (1) synthesis of nano-sized particles, because small particle sizes will shorten lithium-ion diffusion paths and broaden the electrode/electrolyte contact surfaces; (2) replacing Li or Ti with other metal cations (i.e., spiking with other metal cations), which will cause a transition from $Ti^{4+}$ to $Ti^{3+}$ as charge compensation. The transition will lead to an increase in the electronic conductivity; and (3) adding a second conductive phase into the $Li_4Ti_5O_{12}$, such as carbon and conductive oxide.

For example, in "High-performance $Li_4Ti_{5-x}V_xO_{12}$ (0≤x≤0.3) as an anode material for secondary lithium-ion battery," Electrochimica Acta, 54: 7464-7470 (2009), T.-F. Yi et al. disclosed that powders of spinel $Li_4Ti_{5-x}V_xO_{12}$ (0≤x≤0.3) synthesized by solid-state methods. Among these materials, $Li_4Ti_{4.95}V_{0.05}O_{12}$ has the highest initial discharge capacity and cycling performance between 1.0 and 2.0V, while $Li_4Ti_{4.9}V_{0.1}O_{12}$ has the highest initial discharge capacity and cycling performance between 0.0 and 2.0V or between 0.5 and 2.0V. The $Li_4Ti_{4.9}V_{0.1}O_{12}$ sample has a good reversibility and its structure is very advantageous for the transportation of lithium-ions.

In "Graphene as a conductive additive to enhance the high-rate capabilities of electrospun $Li_4Ti_5O_{12}$ for lithium-ion batteries," Electrochimica Acta, 55: 5813-5818 (2010), Zhu et al. disclosed versatile electrospinning methods, by which $Li_4Ti_5O_{12}$ was processed into nano-sized architectures to shorten the distances for Li-ion and electron transport. Graphene was chosen as an effective carbon coating to improve the surface conductivity of the nanocomposites. The as-prepared graphene-embedded $Li_4Ti_5O_{12}$ anode material showed improved discharging/charging and cycling properties, particularly at high rates, such as 22 C. These properties make the nanocomposites attractive anode materials for applications in electric vehicles.

U.S. Pat. No. 6,221,531, issued to Vaughey et al., describes a structure of the spinel type with a general formula $Li[Ti_{1.67}Li_{0.33-y}M_y]O_4$, wherein 0≤y≤0.33 and M represents magnesium and/or aluminum. This structure is presented as useful for improving the electronic conductivity of $Li_4Ti_5O_{12}$ phase. However, improving electronic conductivity of $Li_4Ti_5O_{12}$ phase will not enhance its charging rate capabilities as the electronic conductivity of $Li_4Ti_5O_{12}$ anode is important only during the discharging process.

U.S. Pat. No. 6,827,921B1, issued to Singhal et al., describes ultrafine powders of $Li_4Ti_5O_{12}$ with particle sizes in the range of 25-500 nm. The average size of particles is about 300 nm or less. The particles are composed of nanocrystallites, which have an average size about 30 nm. The nanostructured (or ultrafine) $Li_4Ti_5O_{12}$ powers with a spinel-type structure have improved Li-ion diffusion.

Although these modifications of $Li_4Ti_5O_{12}$ have been reported to have improved properties, there are still great challenges to improve the high-rate capability of $Li_4Ti_5O_{12}$.

SUMMARY OF INVENTION

One aspect of the invention relates to methods for preparing a $Li_4Nb_xTi_{5-x}O_{12}/C$ nanocomposite as an anode material for lithium-ion batteries. A method in accordance with one embodiment of the invention includes the following steps: (a) obtaining a mixture of a lithium salt, niobium pentaoxide, titanium dioxide ($TiO_2$), and a carbon source in a selected stoichiometric ratio; (b) mixing the mixture in a dispersant to produce a slurry; (c) drying the slurry to produce a dried mixture; (d) treating the dried mixture under a protective atmosphere, according to a heating program to produce the $Li_4Nb_xTi_{5-x}O_{12}/C$ nanocomposite.

In accordance with some embodiments of the invention, the heating program comprises: a calcining step at a first temperature, a heating step to a second temperature, a first cooling step to a third temperature, a holding step at the third temperature, and a second cooling step to room temperature, wherein the calcining step is performed at 600° C. for 2-6 hours, the heating step is performed at a rate of 2-20° C. per minute to 950-980° C., the first cooling step is by natural cooling to 800-850° C., the holding step maintains the temperature at 800-850° C. for 16 hours, and the second cooling step is by natural cooling to the room temperature.

In any embodiments described above, the $TiO_2$ may comprise nanoparticles of anatase form. In any embodiments described above, the selected stoichiometric ratio may be: Li:Nb:Ti:C=4:(0.01–0.3):(5–4.7):(2–20). In any embodiments described above, the lithium salt may comprise lithium carbonate, lithium hydroxide monohydrate, acetic acid lithium, or lithium fluoride. In any embodiments described above, the organic carbon source may comprise glucose, sucrose, phenolic resin, epoxy resin, or poly ethylene. In any embodiments described above, the dispersant may comprise ethanol, acetone, or water. In any embodiments described above, the protective atmosphere may comprise helium, nitrogen, acetylene gas, or carbon dioxide. In any embodiments described above, the mixing may be by ball milling, wherein the ball milling is at a rotational speed of about 250-400 r/min for a duration of 4-12 hours. In any embodiments described above, the drying may be performed in an oven at 80-120° C. for about 10-24 hours.

In accordance with some embodiments of the invention, methods are provided for preparing a lithium titanate having the following formula: $Li_4Nb_xTi_{5-x}O_{12}/C$, wherein x represents a number greater or equal to 0.01 and less or equal to 0.3. The prepared lithium titanate is nano structured.

Other aspects and advantages of the invention will be apparent from the following description and the appended claims.

BRIEF DESCRIPTION OF DRAWINGS

For a better understanding of the present invention, reference is made to the following drawings in which.

DEFINITION

Figure 1:
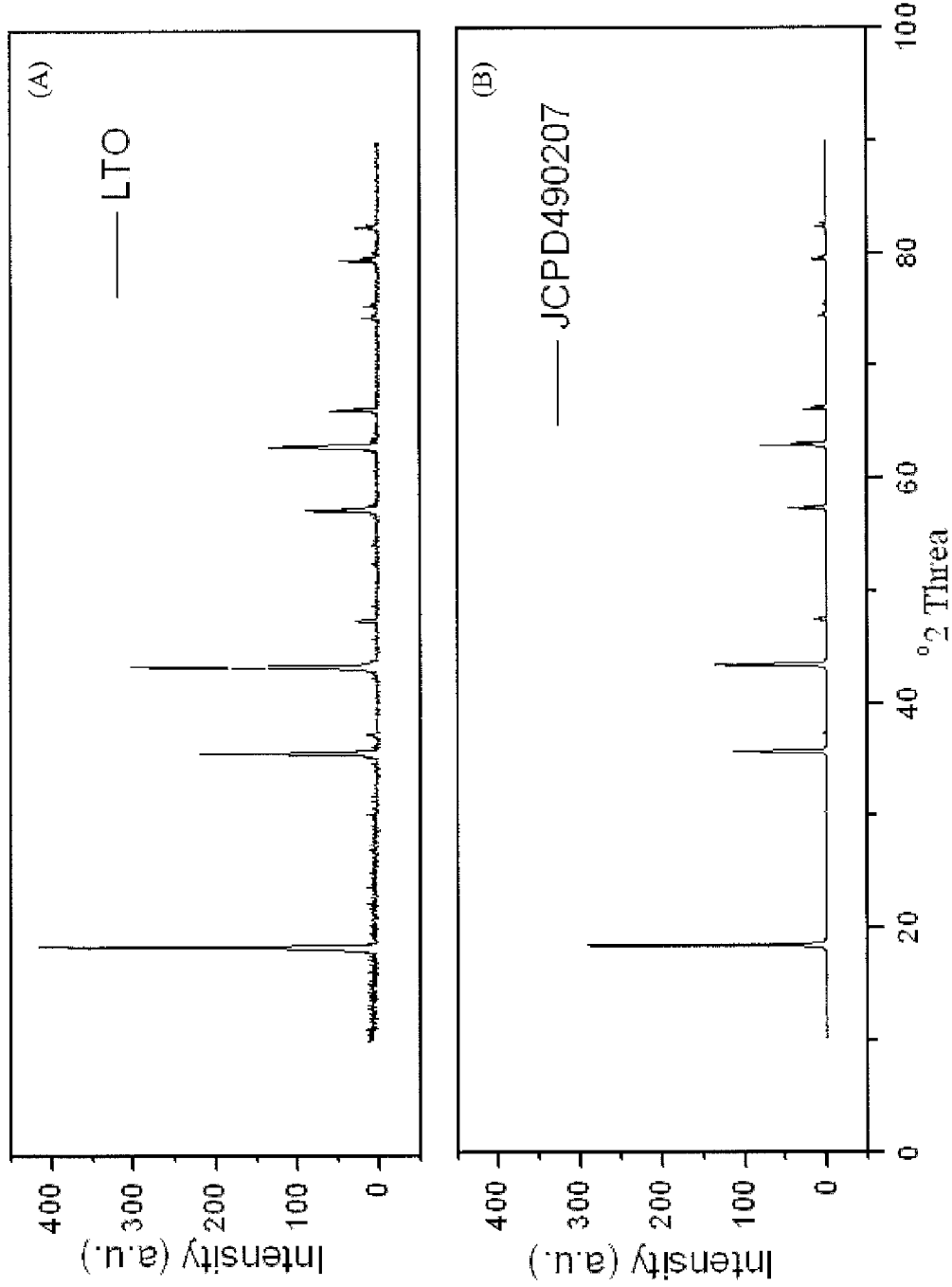
FIG. 1 shows (A) The X-ray diffraction patterns of the as-synthesized $Li_4Nb_xTi_{5-x}O_{12}/C$ nanocomposite; (B) The standard data of LTO phases (ICD00-049-0207)

As used herein, the term "nanoparticle" refers to particles having sizes (diameters) in the range of nanometers (e.g., less than 1 mm). Similarly, "nanocomposite" refers to composite particles having sizes (diameters) in the range of nanometers (e.g., less than 1 mm).

As used herein, the term "dispersant" refers to a solvent capable of helping dispersing powders or particles in a mixture. However, such dispersants should not react with the powders. Suitable dispersants for use with embodiments of the invention may include water, aqueous solutions, organic solvents, or a combination thereof. Examples of dispersants for use with embodiments of the invention may include ethanol, acetone, or water.

As used herein, the term "lithium salt" refers to an organic or inorganic salt that contains lithium ion. A lithium salt is used in embodiments of the invention to provide the lithium ion in the nanocomposite products. Examples of suitable lithium salts may include lithium carbonate, lithium hydroxide monohydrate, acetic acid lithium, or lithium fluoride.

As used herein, the term "carbon source" refers to an organic compound that, after heating, can provide a source of carbon for encapsulating the lithium titanate nanocomposites. Most organic compounds that can be decomposed by heat is suitable for use with embodiments of the invention. Examples of the carbon sources may include glucose, sucrose, phenolic resin, epoxy resin, or poly ethylene.

As used herein, the term "stoichiometric ratio" refers to mole ratio of the metals of concern. For example, in accordance with embodiments of the invention, a stoichiometric ratio may be: Li:Nb:Ti:C=4:(0.01–0.3):(5–4.7):(2–20).

DETAILED DESCRIPTION

Embodiments of the invention relate to methods for preparing Nb-doped, carbon-encapsulated $Li_4Ti_5O_{12}$ nanocomposites. Some embodiments of the invention relate to methods for preparing nanocomposites that comprise: a core of $Li_4Nb_xTi_{5-x}O_{12}$, wherein $0.01 \leq x \leq 0.3$; and a coating of carbon. Using these methods, Nb-doped and carbon encapsulated (i.e., $Li_4Nb_xTi_{5-x}O_{12}/C$) nanocomposites can be prepared by strict control of the raw materials and the heating/sintering conditions.

In accordance with embodiments of the invention, a method for manufacturing $Li_4Nb_xTi_{5-x}O_{12}/C$ nanocomposites may include the step of: proving a mixture of nanometer titanium dioxide, lithium-based component, niobium pentoxide and carbon organic source, in a selected stoichiometric ratio; making a homogeneous slurry out of this mixture; drying the slurry; and then heating the dried mixture according to a well controlled heating program.

For example, a mixture may be prepared with a selected stoichiometric ratio of nanometer-sized particles of titanium dioxide, a lithium-based component, niobium pentoxide, and an organic carbon source. Titanium dioxide ($TiO_2$) has three different mineral forms: rutile, anatase, and brookite forms. Embodiments of the invention preferably use the anatase form. This mixture may be mixed in a dispersant by a suitable means (e.g., ball milling) for a selected duration (e.g., a few hours) to produce a homogeneous slurry. Then, this slurry may be dried in an oven at a suitable temperature (e.g., at 80° C.~120° C.) for an appropriate duration (e.g., several hours). Subsequently, the dried precursor may be heated under a protective atmosphere (e.g., an air or $N_2$ atmosphere) according to a predetermined heating program. Then, the products are allowed to cool, for example, by natural cooling in a tuber furnace.

The above description outlines a general procedure for the preparation of the desired nanocomposites of the invention. One skilled in the art would appreciate that variations and modifications of this general procedure are possible without departing from the scope of the invention. Embodiments of the invention may be better understood with the aid of the

EXAMPLES

Example 1

To prepare $Li_4Nb_xTi_{5-x}O_{12}/C$ nanocomposite, $Li_2CO_3$, $Nb_2O_5$, nanometer-sized $TiO_2$ particles (anatase form), and sucrose were used as raw materials. These starting materials were weighed in the following stoichiometric ratio (mole ratio): Li:Nb:Ti:C=4:0.02:4.98:10. This mixture was thoroughly mixed in $C_2H_5OH$ by ball milling for 4 hours to obtain a homogeneous slurry. The rotational speed of the planetary ball milling was about 400 r/min. Subsequently, the above slurry was dried in an oven at 100° C. for 16 hours and then heated under a flowing $N_2$ atmosphere according to a heating program (described below), followed by natural cooling in the tuber furnace. In accordance with the heating program, the dried mixture was calcined at 600° C. for 2 hours, and then heated to 950° C. at a rate of 10° C. per minute. Then, it was allowed to naturally cool to 800° C. and then maintained at 800° C. for 10 hours under a $N_2$ atmosphere. Afterwards, it was allowed to cool to room temperature to produce the $Li_4Nb_xTi_{5-x}O_{12}/C$ nanocomposite.

Example 2

To investigate the influences of various parameters, such as ratio of the raw materials, mixing, drying, sintering, on the electrochemical characteristics of $Li_4Nb_xTi_{5-x}O_{12}/C$ nanocomposite products, a series of preparations were conducted as follows:

(1) The starting materials were weighed in a stoichiometric ratio (mole ratio) of Li:Nb:Ti:C=4:0.15:4.85:15, and thoroughly mixed in $C_2H_5OH$ by ball milling for 8 hours to obtain a homogeneous slurry. Subsequently, the above slurry was dried in an oven at 100° C. for 16 hours. The dried mixture was calcined at 600° C. for 4 hours, then heated to 960° C. at a rate of 10° C. per minute. Then, the mixture was allowed to cool to 850° C. and maintained at 850° C. for 16 hours under a $N_2$ atmosphere. This was then allowed to cool to room temperature to produce the $Li_4Nb_xTi_{5-x}O_{12}/C$ nanocomposite.

(2) The starting materials were weighed in a stoichiometric ratio (mole ratio) of Li:Nb:Ti:C=4:0.2:4.8:20, and thoroughly mixed in $C_2H_5OH$ by ball milling for 10 hours to obtain a homogeneous slurry. Subsequently, the above slurry was dried in an oven at 90° C. for 20 hours. The dried mixture was heated at a rate of 5° C. per minute to 600° C. and calcined at 600° C. for 4 hours. Then, it was heated to 970° C. at a rate of 10° C. per minute and then allowed to cool to 820° C. and maintained at 820° C. for 18 hours under a $N_2$ atmosphere. Afterwards, it was allowed to cool to room temperature to produce the $Li_4Nb_xTi_{5-x}O_{12}/C$ nanocomposite.

(3) The starting materials were weighed in a stoichiometric ratio (mole ratio) of Li:Nb:Ti:C=4:0.3:4.7:5, and thoroughly mixed in $C_2H_5OH$ by ball milling for 12 hours to obtain a homogeneous slurry. Subsequently, the above slurry was dried in an oven at 80° C. for 24 hours. The dried mixture was heated at a rate of 5° C. per minute to 600° C. and calcined at 600° C. for 6 hours. Then, it was heated to 980° C. at a rate of 10° C. per minute and then allowed to cool to 840° C. and maintained at 840° C. for 12 hours under a $N_2$ atmosphere. Afterwards, it was allowed to cool to room temperature, to produce the $Li_4Nb_xTi_{5-x}O_{12}/C$ nanocomposite.

Example 3

To investigate the influences of niobium doping on the electrochemical characteristics of lithium titanate, $Ti^{4+}$ was partially substituted with $Nb^{5+}$. This substitution (doping) will cause a transition of a certain amount of $Ti^{4+}$ to $Ti^{3+}$ as charge compensation. Specifically, niobium-doped lithium titanate having the following formula: $Li_4Nb_xTi_{5-x}O_{12}$, wherein x represents a number greater or equal to 0.01 and less or equal to 0.3 ($0.01 \leq x \leq 0.3$), was prepared. The prepared lithium titanate is nanostructured. $Li_2CO_3$, $Nb_2O_5$, and nanometer-sized $TiO_2$ particles (anatase form) were used as raw materials.

The stating materials were weighed in a stoichiometric ratio (mole ratio) of Li:Nb:Ti=4:x:(5-x), and thoroughly mixed in $C_2H_5OH$ by ball milling for 8 hours to obtain a homogeneous slurry. The effects of different niobium doping amounts (including x=0.01, 0.05, 0.10, 0.15, 0.20, 0.25, and 0.3) on the electrochemical properties of lithium titanate were investigated. The above slurry was dried in an oven at 100° C. for 16 hours. The dried mixture was heated at a rate of 10° C. per minute to 600° C. and calcined at 600° C. for 4 hours. Then, it was heated to 960° C. at a rate of 10° C. per minute. It was allowed to cool to 850° C. and maintained at 850° C. for 16 hours under a $N_2$ atmosphere. Afterwards, it was allowed to cool to room temperature to produce the $Li_4Nb_xTi_{5-x}O_{12}$ nanocomposites.

The electrochemical behaviors of these niobium doped lithium titanate nanocomposites were studied. It was found that $Li_4Nb_{0.05}Ti_{4.95}O_{12}$ (i.e., x=0.05) had a higher specific capacity and lower polarization than those of the pristine $Li_4Ti_5O_{12}$.

Example 4

To investigate the influences of carbon coating on the electrochemical characteristics of lithium titanate, a carbon-coated lithium titanate was prepared. The prepared lithium titanate is nanostructured. In this preparation, $Li_2CO_3$, sucrose, and nanometer-sized $TiO_2$ particles (anatase form) were used as raw materials. The starting materials were weighed in a stoichiometric ratio (mole ratio) of Li:Ti:C=4:5:y. The mixture was thoroughly mixed in $C_2H_5OH$ by ball milling for 8 hours to obtain a homogeneous slurry.

To investigate the effects of different carbon coating amounts on the electrochemical characteristics of lithium titanates, several slurries were prepared wherein y=5, 10, 15, or 20. Subsequently, the above slurries were dried in an oven at 100° C. for 16 hours. The dried mixtures were heated at a rate of 10° C. per minute to 600° C. and calcined at 600° C. for 4 hours. These were then heated to 960° C. at 10° C. per minute and then allowed to cool to 850° C. and maintained at 850° C. for 16 hours under a $N_2$ atmosphere. Afterwards, they were allowed to cool to room temperature to produce the $Li_4TiO_{12}/C$ nanocomposites.

The electrochemical behaviors of these carbon-coated lithium titanates were studied. It was found that $Li_4TiO_{12}/C$ (y=15) had a higher specific capacity and lower polarization than those of the pristine $Li_4Ti_5O_{12}$.

Example 5

For comparison, the nanocomposites of $Li_4Ti_5O_{12}$ were prepared under similar conditions, $Li_2CO_3$ and nanometer-sized $TiO_2$ particles (anatase form) were used as raw materials. These starting materials were weighed in a stoichiometric ratio (mole ratio) of Li:Ti=4:5. The mixture was thoroughly mixed in $C_2H_5OH$ by ball milling for 8 hours to obtain a homogeneous slurry. The rotational speed of the ball mill is about 400 r/min. Subsequently, the above slurry was dried in an oven at 100° C. for 16 hours and then heated under flowing air atmosphere accord with a heating program (described below), followed by natural cooling to room temperature in the tuber furnace. In accordance with the heating program, the mixture was calcined at 600° C. for 4 hours. It was then heated to 960° C. and then allowed to cool to 850° C. and maintained at 850° C. for 16 hours. The heating rate was 10° C. per minute. Afterwards, it was allowed to cool to room temperature to produce the pristine $Li_4Ti_5O_{12}$ nanocomposites.

Example 6

For comparison, micrometer-sized lithium titanate particles were prepared under similar conditions. For this preparation, $Li_2CO_3$ and micron-sized $TiO_2$ particles (anatase form) were used as raw materials. These starting materials were weighed in a stoichiometric ratio (mole ratio) of Li:Ti=4:5. The mixture was thoroughly mixed in $C_2H_5OH$ by ball milling for 8 hours to obtain a homogeneous slurry. The rotational speed of the ball mill was about 400 r/min. Subsequently, the above slurry was dried in an oven at 100° C. for 16 hours and then heated under flowing air atmosphere according to a heating program (described below), followed by natural cooling to room temperature in the tuber furnace. In accordance with the heating program, the mixture was calcined at 600° C. for 4 hours, heated up to 960° C., and then allowed to cool to 850° C. and maintained at 850° C. for 16 hours. The heating rate was 10° C. per minute. Afterwards, it was allowed to cool to room temperature to produce the pristine micron-sized $Li_4Ti_5O_{12}$ composite.

The crystal structures of the synthesized powers were examined by X-ray diffraction (XRD). The experimental diffraction patterns were collected at room temperature by step scanning in the range of $10° \leq 2\theta \leq 90°$. As shown in FIG. 1, it is found that the 20 diffraction patterns of $Li_4Nb_xTi_{5-x}O_{12}/C$ nanocomposite are in accordance with those of the $Li_4Ti_5O_{12}$ cubic spinel single phase structure. This suggests that the Nb-doping, carbon-encapsulating and nanocrystalline treatment had no effects on the spinel structures of lithium titanate.

Figure 2:
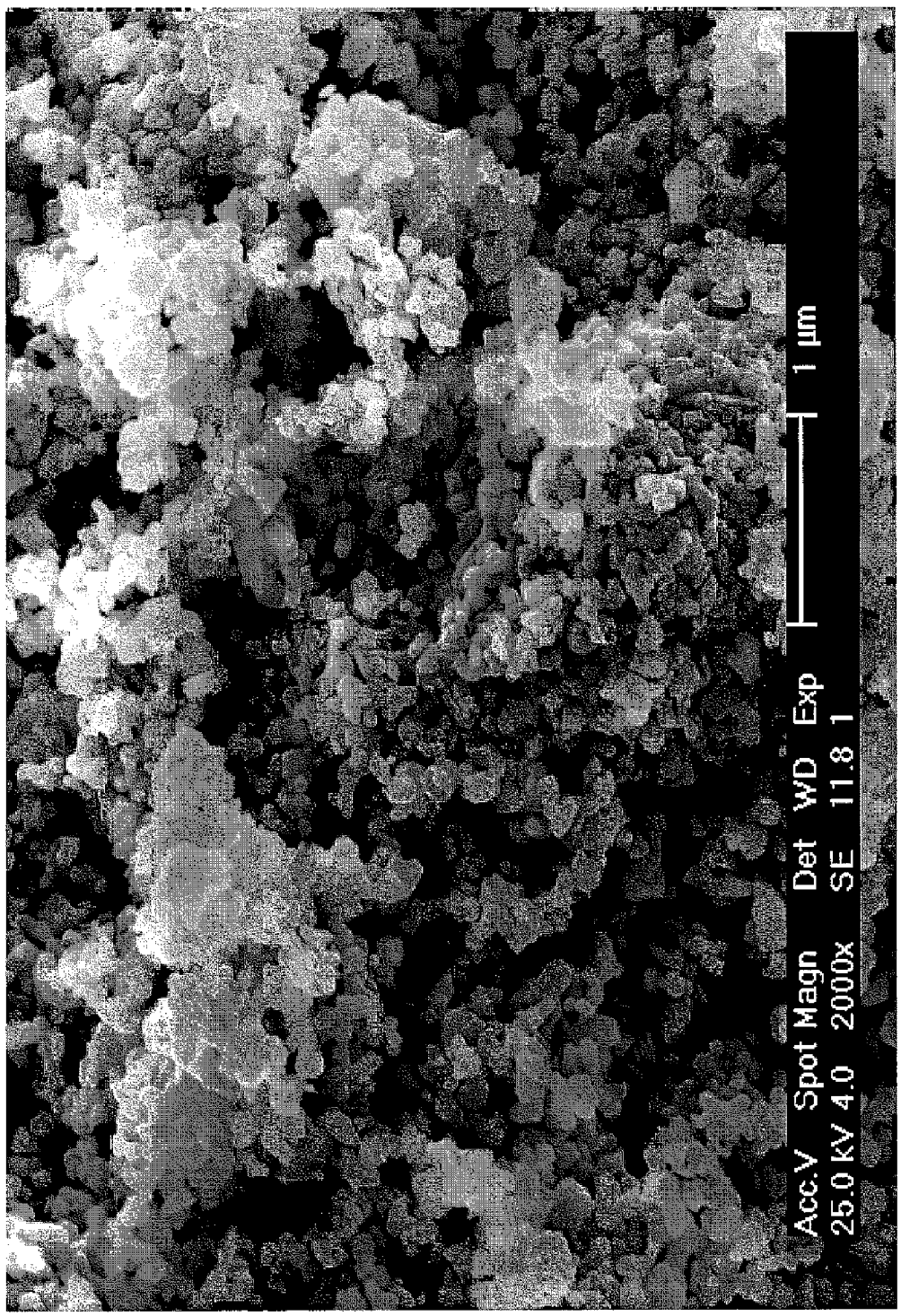
FIG. 2 shows a scanning electron microscopy (SEM) photograph of $Li_4Nb_xTi_{5-x}O_{12}/C$ nanocomposite prepared according to one embodiment of the present invention.

The scanning electron microscope (SEM) image of $Li_4Nb_xTi_{5-x}O_{12}/C$ nanocomposite is shown in FIG. 2. The grains of the $Li_4Nb_xTi_{5-x}O_{12}/C$ nanocomposite are small, with the sizes generally distributed in the range of 100-200 nm. Small diameters will increase the contact areas between grains and electrolyte, thereby improving the specific capacities of the electrodes.

Figure 3:
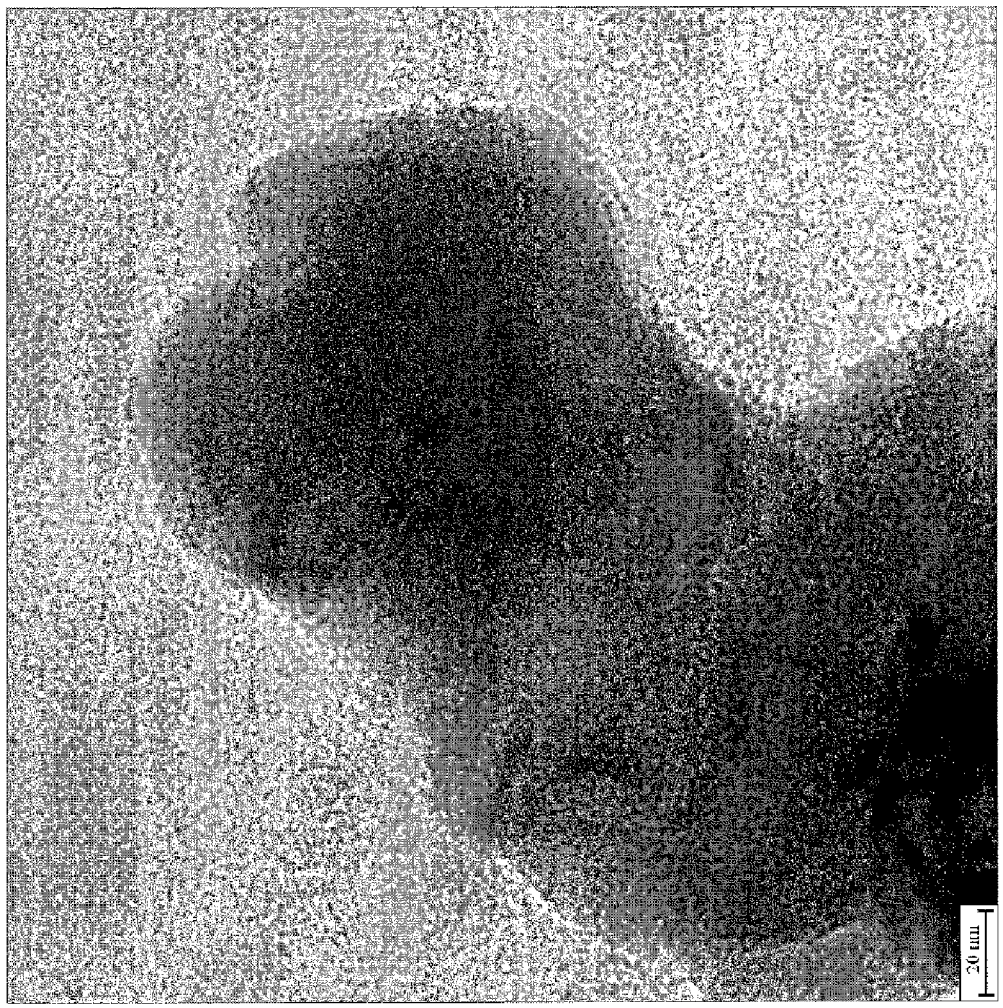
FIG. 3 shows the transmission electron microscopy (TEM) image of $Li_4Nb_xTi_{5-x}O_{12}/C$ nanocomposite prepared according to one embodiment of the present invention.
Figure 4:
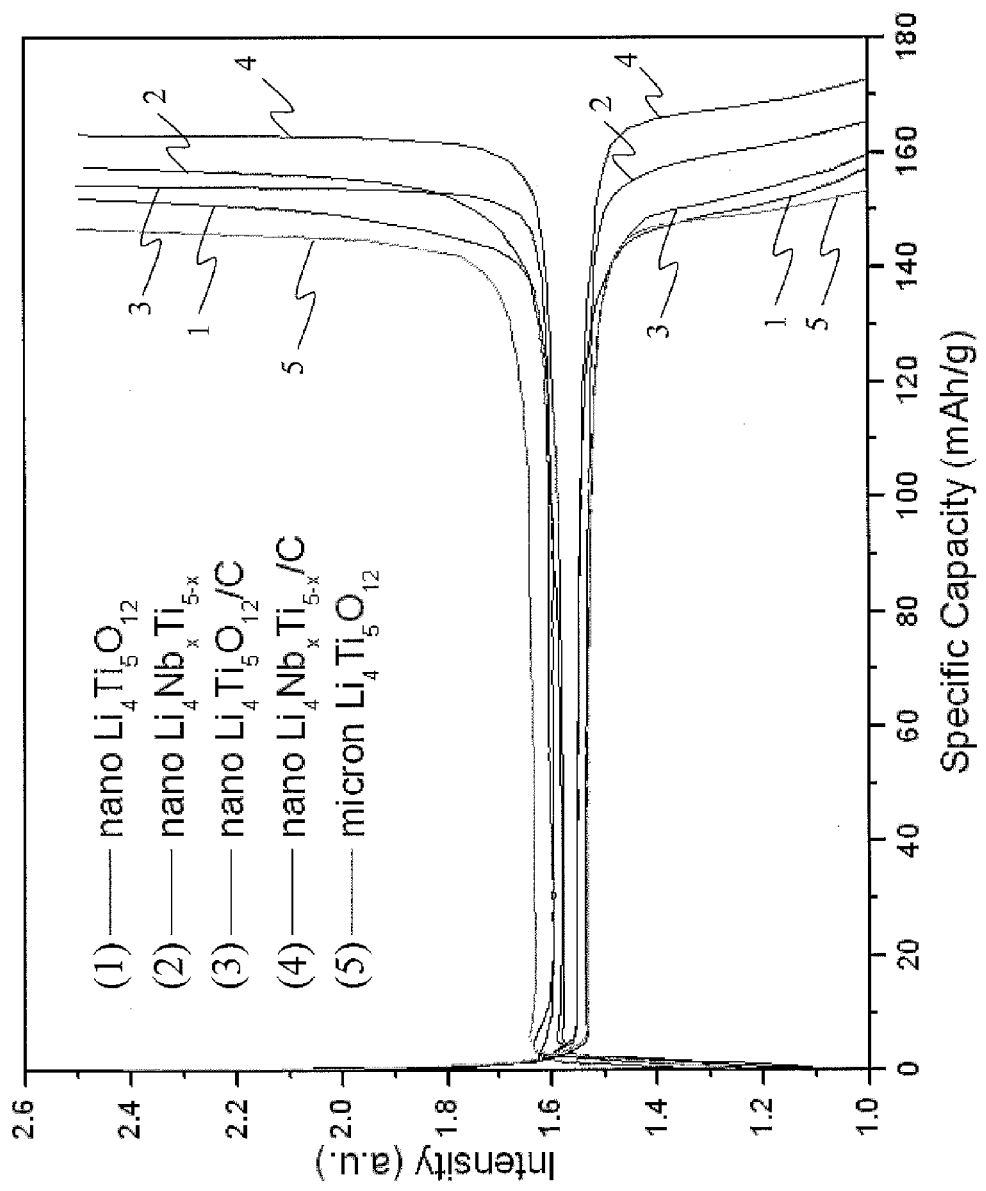
FIG. 4 shows the first charge-discharge profiles at a rate of 0.2 C of (1) pristine nano-$Li_4Ti_5O_{12}$; (2) Nb-doped nano-$Li_4Ti_5O_{12}$; (3) carbon-encapsulated nano-$Li_4Ti_5O_{12}$; (4) Nb-doped, carbon-encapsulated $Li_4Ti_5O_{12}$ nanocomposite; and (5) pristine micron $Li_4Ti_5O_{12}$.
Figure 5:
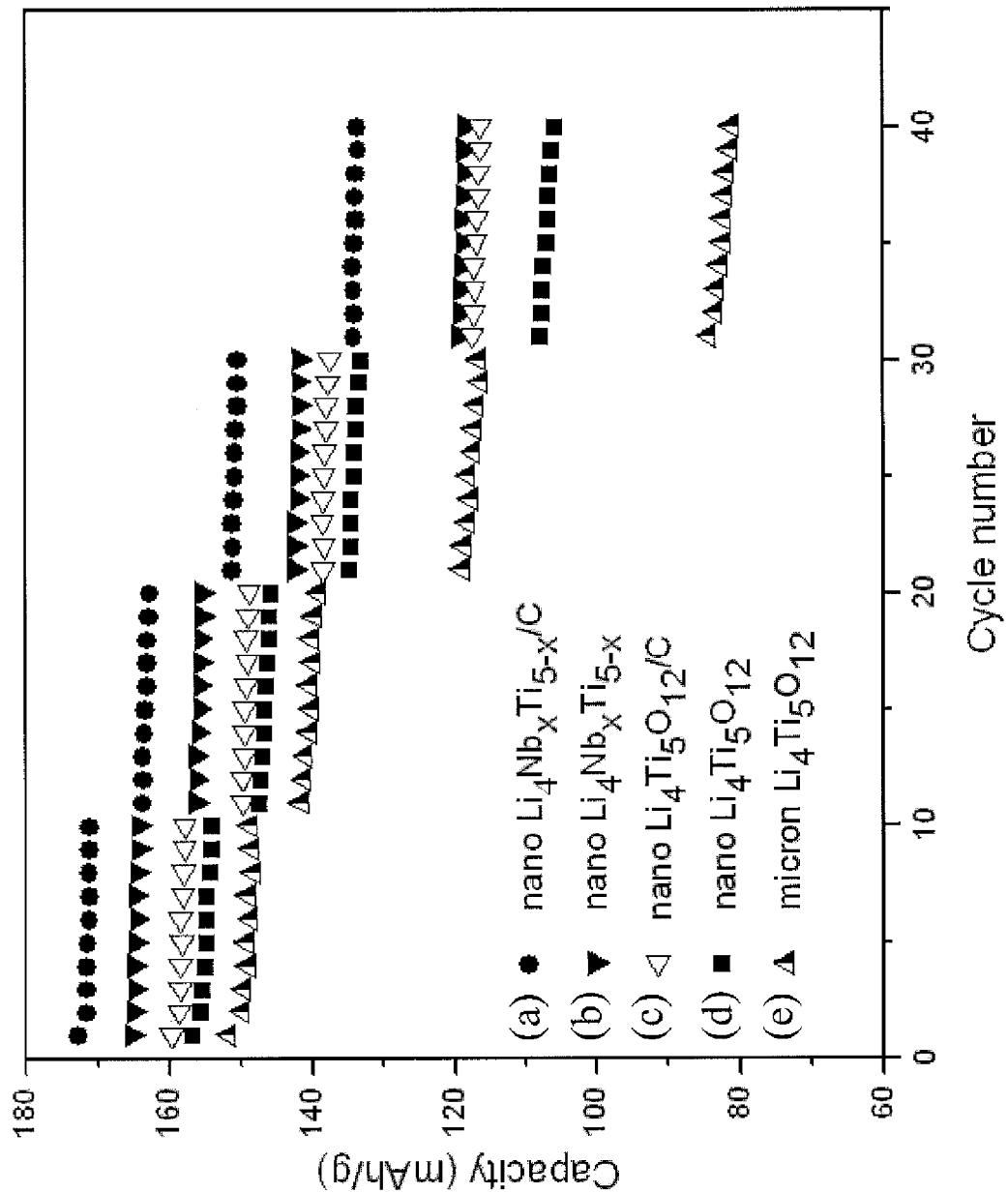
FIG. 5 shows the cycling performance at room temperature of (a) Nb-doped, carbon-encapsulated $Li_4Ti_5O_{12}$ nanocomposite; (b) Nb-doped nano-$Li_4Ti_5O_{12}$; (c) carbon-encapsulated nano-$Li_4Ti_5O_{12}$; (d) pristine nano-$Li_4Ti_5O_{12}$; and (e) pristine micron $Li_4Ti_5O_{12}$. Charge-discharge rates are 0.2 C, 1.0 C, 5.0 C, and 10 C, respectively.

The transmission electron microscope (TEM) image of the $Li_4Nb_xTi_{5-x}O_{12}/C$ nanocomposite exhibits low uniformity of carbon coating, as shown in FIG. 3. The electrochemical properties of the samples are determined by the charge/discharge tests at constant current densities. FIG. 4 shows the first charge-discharge curves of the synthesized samples at a current rate of 0.2 C. The Nb-doped, carbon-encapsulated $Li_4Ti_5O_{12}$ nanocomposite has the highest specific capacity and the lowest polarization. The cycling performance at room temperature of the samples at 0.2 C, 1.0 C, 5.0 C and 10.0 C are shown in FIG. 5. It is founded that the Nb-doped, carbon-encapsulated $Li_4Ti_5O_{12}$ nanocomposite has the best rate and cycling performance.

Overall, these results suggest that the sample prepared according to the first process of example 2 has the best rate and cycling performance.

Figure 6:
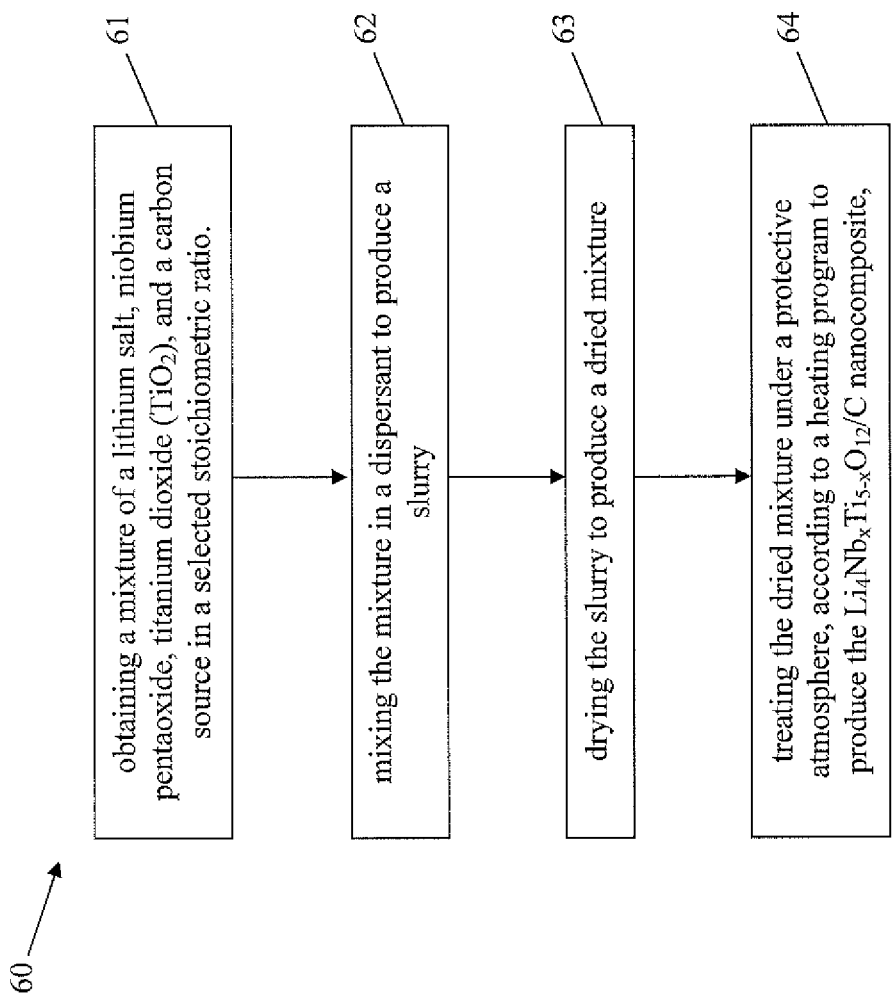
FIG. 6 shows a flow chart illustrating a method in accordance with one embodiment of the invention.

FIG. 6 shows a flow chart illustrating a method of the invention. As shown, a method 60 comprises: obtaining a mixture of a lithium salt, niobium pentaoxide, titanium dioxide ($TiO_2$), and a carbon source in a selected stoichiometric ratio (step 61). The $TiO_2$ preferably comprises nanoparticles of anatase form. The lithium salt may comprise lithium carbonate, lithium hydroxide monohydrate, acetic acid lithium, or lithium fluoride. The carbon source may comprise glucose, sucrose, phenolic resin, epoxy resin, or poly ethylene. The selected stoichiometric ratio is: Li:Nb:Ti:C=4:(0.01–0.3):(5–4.7):(2–20).

The mixture is then mixed in a dispersant (e.g., ethanol) to produce a slurry (step 62). The dispersant may comprise ethanol, acetone, or water. The protective atmosphere comprises helium, nitrogen, acetylene gas, or carbon dioxide. The mixing may be by ball milling.

Then, the slurry is dried (step 63). The drying may be performed at an elevated temperature, such as in an oven (e.g., in an oven at 80-120° C. for about 10-24 hours).

Finally, the dried mixture is calcined and heated according to a well controlled heating program to produce the desired nanocomposites (step 64). The heating program, for example, may comprise: a calcining step performed at 600° C. for 2-6 hours, a heating step performed at a rate of 2-20° C. per minute to 950-980° C., a first cooling step by natural cooling to 800-850° C., a holding step maintaining the temperature at 800-850° C. for 16 hours, and a second cooling step is by natural cooling to the room temperature.

Advantages of embodiments of the invention may include one or more of the following. Embodiments of the invention provide convenient methods for preparing lithium titanate nanocomposites that are niobium-doped and/or carbon-coated. These methods are easy to carry out using conventional equipment. The materials for these preparations are conventional and commercially available. These novel nanocomposites have improved electrochemical characteristics, as compared with the pristine lithium titanate composites. These nanocomposites will be good anode materials for lithium-ion batteries.

Even though the present invention has been described using specific embodiments, it is understood that many variations and modifications could be made to said embodiments, and the present invention covers all such modification, usage or adaptations of the present invention that generally follow the principles of the invention and including any variation of the present description which become known or are conventional in the field of activity wherein the present invention is used, and which can apply to the essential elements mentioned above, in agreement with the scope of the following claims.

What is claimed is:

1. A method for preparing a $Li_4Nb_xTi_{5-x}O_{12}/C$ nanocomposite, comprising:
    (a) obtaining a mixture of a lithium salt, niobium pentoxide, titanium dioxide ($TiO_2$), and a carbon source in a selected stoichiometric ratio;
    (b) mixing the mixture in a dispersant to produce a slurry;
    (c) drying the slurry to produce a dried mixture; and
    (d) treating the dried mixture according to a heating program to produce the $Li_4Nb_xTi_{5-x}O_{12}/C$ nanocomposite, wherein the heating program comprises: a calcining step at a first temperature, a heating step to a second temperature, a first cooling step to a third temperature, a holding step at the third temperature, and a second cooling step to room temperature.

2. The method according to claim 1, wherein the calcining step is performed at 600° C. for 2-6 hours, the heating step is performed at a rate of 2-20° C. per minute to 950-980° C., the first cooling step is by natural cooling to 800-850° C., the holding step maintains the temperature at 800-850° C. for 16 hours, and the second cooling step is by natural cooling to the room temperature.

3. The method according to claim 1, wherein the selected stoichiometric ratio is: Li:Nb:Ti:C=4:(0.01-0.3):(5-4.7):(2-20).

4. The method according to claim 1, wherein the $TiO_2$ comprises nanoparticles of anatase form.

5. The method according to claim 1, wherein the lithium salt comprises lithium carbonate, lithium hydroxide monohydrate, acetic acid lithium, or lithium fluoride.

6. The method according to claim 1, wherein the carbon source comprises glucose, sucrose, phenolic resin, epoxy resin, or poly ethylene.

7. The method according to claim 1, wherein the dispersant comprises ethanol, acetone, or water.

8. The method according to claim 1, wherein the treating the dried mixture according to the heating program is performed under an atmosphere selected from helium, nitrogen, acetylene gas, or carbon dioxide.

9. The method according to claim 1, wherein the mixing is by ball milling.

10. The method according to claim 9, wherein the ball milling is at a rotational speed of about 250-400 r/min for a duration of 4-12 hours.

11. The method according to claim 1, wherein the drying is performed in an oven at 80-120° C. for about 10-24 hours.

* * * * *